UNITED STATES PATENT OFFICE.

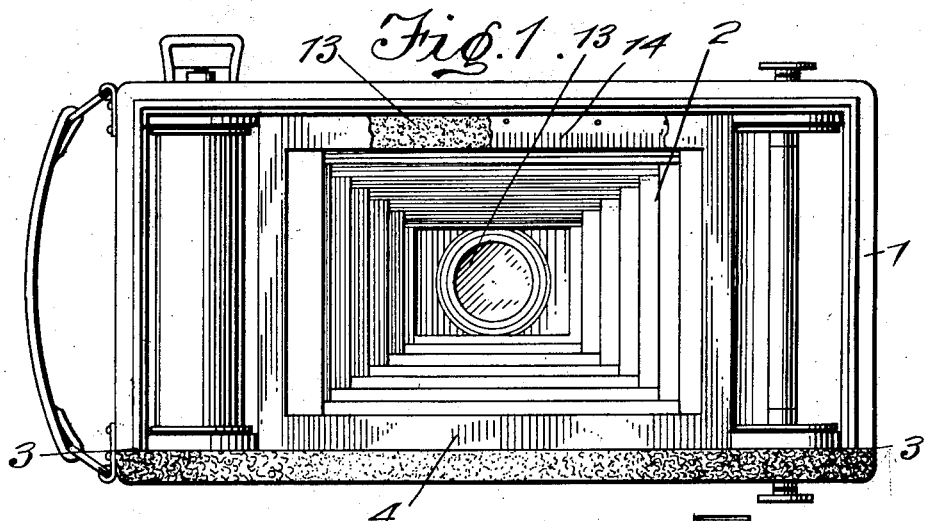
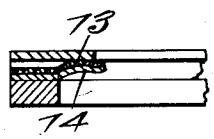
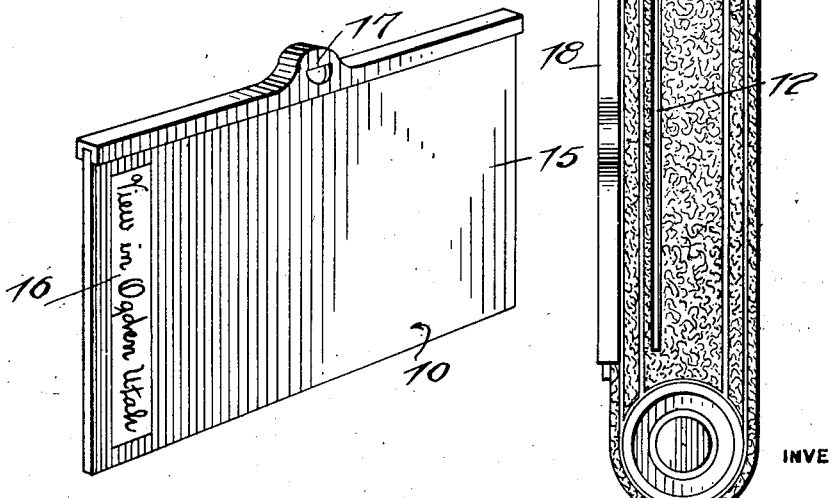

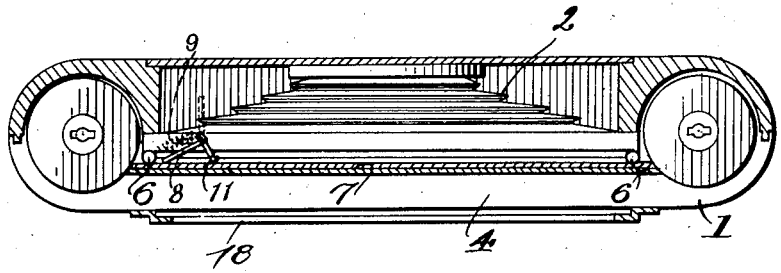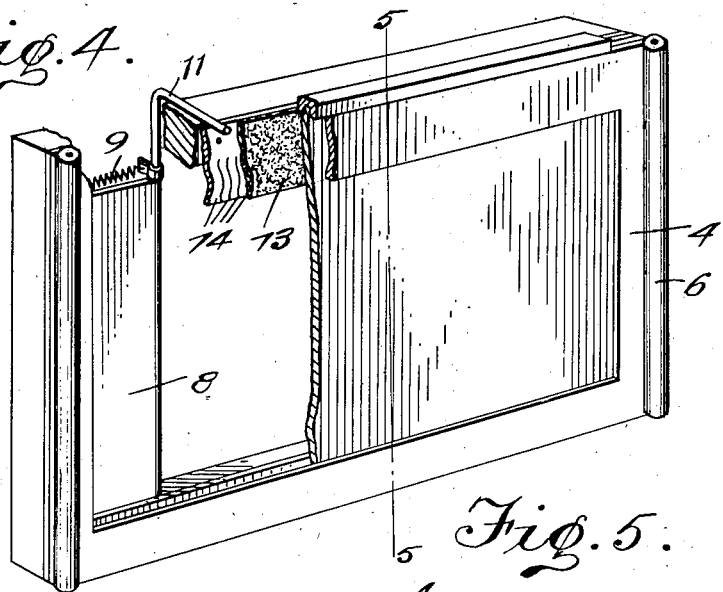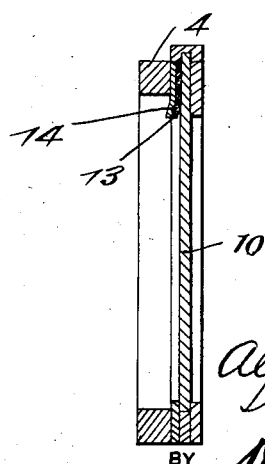

ALFRED C. MOSS, OF OGDEN, UTAH.

AUTOGRAPHIC CAMERA.

1,252,605.  Specification of Letters Patent.  Patented Jan. 8, 1918.

Application filed September 2, 1915. Serial No. 48,669.

*To all whom it may concern:*

Be it known that I, ALFRED CHARLES MOSS, a citizen of the United States, residing at Ogden, in the county of Weber and State of Utah, have invented certain new and useful Improvements in Autographic Cameras, of which the following is a specification.

My invention relates to a camera, and more particularly to that type of camera which has recently become known in the art as an autographic camera wherein memoranda, such as the title of the exposure is recorded.

A particular object of the present invention resides in providing a camera of the above-mentioned type, wherein a direct photographic reproduction of the memoranda or title is produced upon the sensitized member or negative by an exposure.

Another object resides in providing a memoranda or title-carrying transparency or slide which is inserted between the usual lens of the camera and the sensitized member, so that the reproduction of the title upon the sensitized member or negative may be effected by an exposure.

Still another object resides in the provision of an additional shutter which extends along one edge of the film, and a removable title-carrying transparency member or slide, that portion which carries the title being transparent and of substantially the exposure area of the additional shutter, whereas the other portion is opaque and obscures the remainder of the sensitized member during exposure to produce the title on the negative.

And a still further object resides in the provision of means for closing the slit through which the said transparency slide is inserted, and for carrying such slide in connection with the camera when not in the inserted position.

In the drawings annexed hereto and forming a part of the specification, and in which I have illustrated a specific embodiment of the invention:

Figure 1 is a rear elevation of the camera with the back plate removed and parts broken away.

Fig. 2 is a side elevation of the camera.

Fig. 3 is a sectional view on the line 3—3 of Fig. 1.

Fig. 4 is a perspective view of the supplemental frame, or slide-carrying frame, removed from the camera.

Fig. 5 is a sectional view on the line 5—5 of Fig. 4.

Fig. 6 is a perspective view of the title-carrying slide, and

Fig. 7 is a detail sectional view on the line 5—5 of Fig. 4 with the slide removed from the frame.

In the drawings, 1 represents a frame of an ordinary folding camera provided with a bellows-focusing arrangement 2, having at its forward end the lens 3, the exposure being controlled by any usual type of shutter (not shown), and not comprising a portion of my invention.

Within the camera and surrounding the focal area is a supplemental frame 4 having at each end a roller 6 over which the film or sensitized member 7 is trained. At one end the frame 4 carries a shutter 8, normally retained in a closed position by a spring 9. The frame 4 is fitted to receive an insertible title-carrying slide or transparency 10 to be hereinafter specifically described and which, upon insertion, may engage a member 11 to open the said shutter 8, said shutter opening toward the bellows-focusing arrangement 2. The frame 4 is arranged so that one side registers with a slit 12 in the side of the camera frame 1 and that side of said frame 4 is closed in a light-tight manner by the cloth flap 13 being pressed into engagement with the opposite side of the frame by means of springs 14.

The title-carrying slide or transparency comprises an opaque portion 15 substantially the extent of the focal area of the camera, provided along one edge with a transparent portion 16 substantially the exposure area of the additional shutter, and adapted to have written thereon the title of an exposure to be made. This slide is further provided with a finger member 17 running along one edge. The slide is adapted for insertion in the slit 12 of the camera so as to lie in the frame 4 between the additional shutter and the film, and with the transparent portion 16 in registry with the exposure area of the additional shutter.

In order to take a picture and record the title of the picture on the negative, the picture desired is first taken in the usual manner upon the sensitized member. The title is then written in the transparent portion of the title carrying slide 10, the latter is then inserted in the frame 4 through the slit 12 in the camera, which serves to open the additional shutter and to obscure the remainder of the sensitized member so that an exposure will not in any way affect that portion lying outside of the additional shutter. An exposure is then made by operating the camera shutter and in this way an undeveloped direct photographic reproduction of the title is made upon the film, which, when the film is developed, is legibly recorded thereon. After such exposure is made, the slide is removed and placed in a holder 18 on the back of the camera. The removal of the title carrying slide permits the spring 9 to close the shutter 8.

In the above-mentioned manner the title may be produced upon the negative after making an exposure and may be photographically printed in the negative and in the positive produced from the negative, the only requirement being that after making the first exposures the title be written in the transparent area 16 of the title-carrying slide 10, and the procedure above indicated be carried out.

From the foregoing it will be apparent that I have provided an autographic camera of simple and practical construction. However, while I have herein described a specific embodiment of the invention, it is to be understood that the invention is not limited thereto except in so far as the appended claims import.

I claim:—

1. In combination with a camera adapted to contain a sensitized member, a slide adapted for insertion in said camera in front of said sensitized member and having a transparent area adapted to contain inscriptions to be photographed upon said sensitized member, and a spring actuated shutter adapted to automatically close upon removal of said slide to protect the inscription receiving portion of said sensitive member from light when said slide is removed.

2. In combination with a camera adapted to contain a sensitized member; a slide inserted in front of said sensitized member and having a relatively small transparent area provided with matter to be photographed on said sensitized member, and a shutter spring actuated to automatically close when said slide is removed and protect the inscription receiving portion of said sensitive member from light when said slide is removed.

3. In a camera, a frame in said camera adapted to support a sensitized member, the said frame having a slot in one side thereof adapted to receive a slide, a shutter extending laterally across said frame, an actuating arm connected to said shutter, the said arm being disposed across said slot, and a spring for normally holding said shutter in closed position.

4. In a camera, a frame in said camera adapted to support a sensitized member, the said frame having a longitudinal slot at one side thereof, a slide having a transversely disposed transparent portion adapted to be inserted in said slot to cover said sensitized member, a shutter comprising a plate arranged across said frame, a spring for normally holding said shutter in closed position, an actuating arm connected to said shutter and disposed in the path of travel of said slide, the said slide being adapted to engage said arm to move the shutter to open position, and the said shutter being arranged over the space to be occupied by said transparent portion.

5. A camera adapted to contain a sensitized member and having a slot therein, a slide having a transparent portion carrying matter to be photographed on said sensitized member, a shutter within said camera normally covering and protecting from light that portion of the sensitized member which is to receive the matter on said transparent portion, and the said shutter being opened when said slide is inserted in said camera to expose the underlying sensitized member to light entering the camera through the lens thereof.

In testimony whereof I affix my signature in presence of two witnesses.

ALFRED C. MOSS.

Witnesses:
W. J. WRIGHT,
J. H. KNAUSS.